Dec. 25, 1962  R. P. ROBICHAUX  3,069,996
BUTTER CHURNING APPARATUS
Filed June 9, 1958
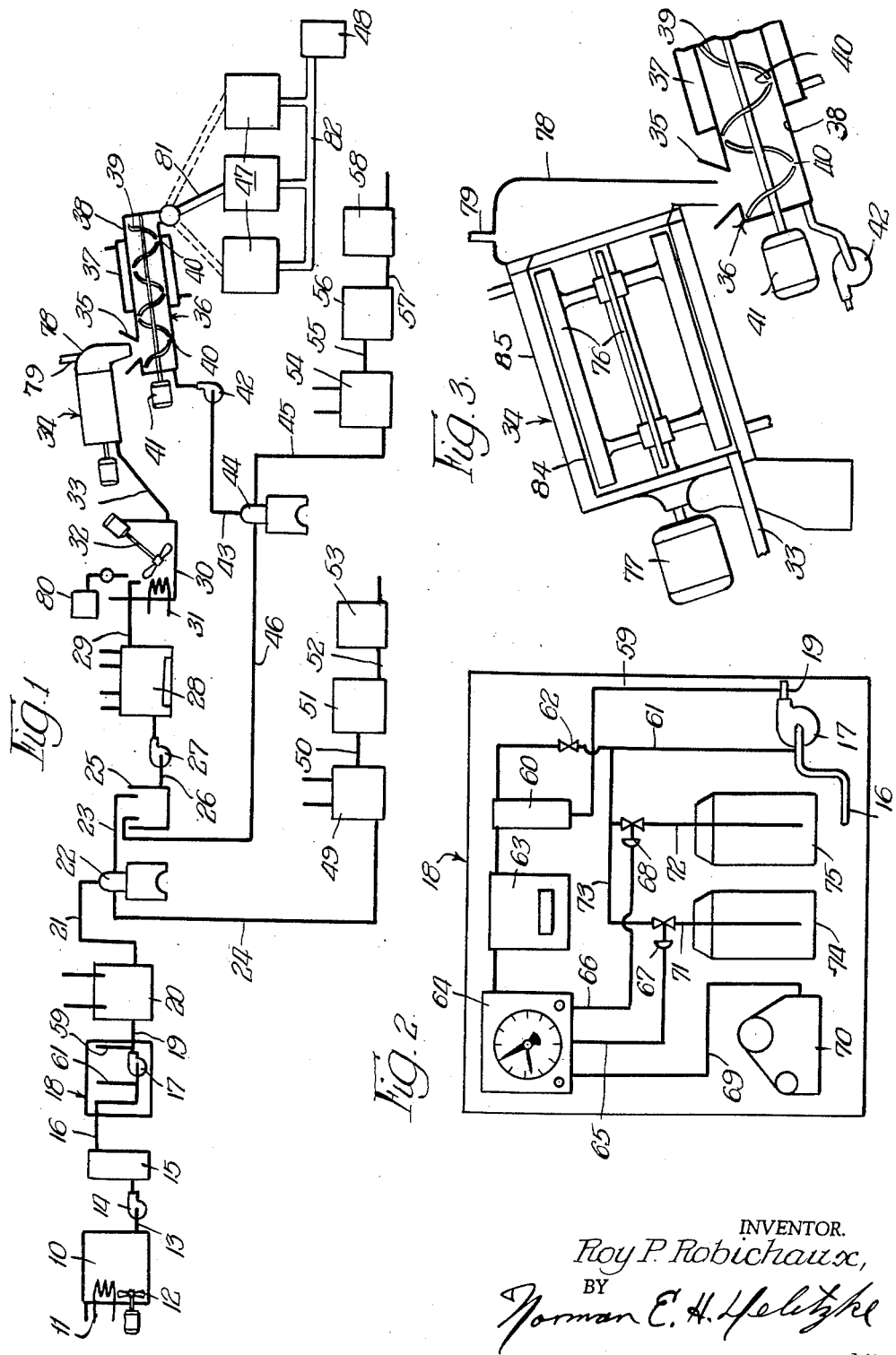
INVENTOR.
*Roy P. Robichaux,*
BY
*Norman E. H. Helitzke*
ATTY

United States Patent Office 3,069,996
Patented Dec. 25, 1962

---

3,069,996
BUTTER CHURNING APPARATUS
Roy P. Robichaux, 1913 11th St., Monroe, Wis.
Filed June 9, 1958, Ser. No. 740,720
13 Claims. (Cl. 99—244)

This invention pertains to improvements in apparatus and method for the continuous and automatic standardization or adjustment of flowable materials to secure desired conditions as to variable characteristics of the materials and to the conversion of the flowable materials to produce one or more end products having predetermined values with respect to the mentioned variable characteristics.

More particularly stated this invention pertains to improvements in a continuously and automatically operable system and process for treating flowable materials to adjust the pH or hydrogen ion concentration value thereof and to convert the adjusted materials into one or more end products having a controlled and predetermined pH value and predetermined chemical and physical characteristics.

Still more particularly stated this invention relates to certain improvements in a continuously and automatically operable system and method for treating a flowing stream of material of variable pH value, continuously testing the material and standardizing or adjusting such variable pH value to a predetermined and substantially fixed pH value and promptly after such adjustment continuously converting all or parts of the thus tested and adjusted material into products of predetermined characteristics, such as pH value, while the pH value of the adjusted material remains substantially constant and before such factors, as for example, bacterial action, can cause any undesirable variation in the pH value of the adjusted material.

The invention, both as to apparatus and as to method, may be adapted in part or in its entirety in the processing of such materials, as for example, whole milk, skim milk, buttermilk, whey, ice cream mix, cream and cream concentrates, cane juice, beet juice, sugar syrup, corn syrup, canned foods, soups, brewery products, distillery products, winery products, bakery products, dairy products, confections, vegetable oils, vegetable juices, yeast and yeast manufactures, jellies, jams, vinegar and vinegar products. The invention is not limited to use in the processing of edible products, but the usefulness of the invention extends also, as for example, to the processing of paper pulp products, sulfite liquor control, manufacture and processing of chemicals, water and sewage treatment, water purification control, oil refining, etc.

The invention has particular relation to improvements in a system of apparatus and a method especially useful in the treatment of materials of variable pH values, as for example certain lacteal liquids and similar materials containing acid forming bacteria, to reduce to a minimum the growth of bacteria and to adjust and control to predetermined values the hydrogen ion concentration or pH value of such materials and the pH of the finished products. Such control in the finished product is in part achieved by the prompt conversion of such adjusted materials into the desired end product or products immediately after adjustment to correct pH values and before the pH value of the material as adjusted can appreciably vary from the adjusted predetermined standard and before the bacteria can multiply appreciably. A variation of the pH value as adjusted could result if the bacterial action were permitted to continue or recommence in the product before the adjusted product is converted into the final end product.

Still more specifically stated, this invention finds particular usefulness in the processing of dairy products such as milk and cream incidental to the manufacture of butter and the manufacture of dried buttermilk and the manufacture of dried skim milk, and the incidental adjustment of the pH value of the milk and/or cream promptly before the final conversion of all or certain portions thereof into the final butter product and/or the final dried product or products.

The reference in this application to the particular usefulness of the invention in the treatment of dairy products and the selection of the treatment of a dairy product as the basis for a description of the preferred variant of the invention is made for the purpose of example and clarity only and is not to be interpreted as a limitation of the invention. Accordingly, the hereinafter contained description of the preferred embodiment of the invention will concern itself primarily with apparatus and method of treating a dairy product such as sour milk or sour cream in the manufacture of butter and dried skim milk and dried buttermilk.

The copending continuation in part application Serial No. 834,583, filed July 18, 1959, discloses certain adaptations of certain portions of this invention in connection with butter and butter churning methods and apparatus.

Milk, being a highly complex biological product, including, among other things, serums and solids and fats, and being highly perishable, due, among other reasons to the development of acid conditions as a result of bacterial actions, is extremely sensitive to many types of treatment, for example, heat treatment, agitation, and chemical reactions. The acid content of the milk product has a pronounced bearing upon the extent to which and the manner in which the product must be treated to enable the extraction of the milk solids and/or the extraction of milk fat from the milk or cream and the manner in which such solids and/or fats react in subsequent treatments in the manufacture of end products such as butter or dried milk products, and upon the chemical and physical characteristics of such end products. It should of course be understood that in the processing of dairy products, as well as in the processing of other products, by the use of this invention, it may be desirable to adjust the pH value of the material being processed by the addition of an alkaline adjusting material or an acid adjusting material as the case may be, depending upon the condition of the material and the end result to be obtained. This invention is equally well adaptable for use in either such type of alkaline or acid adjustment.

It is common practice in the processing of many food products, for example, sour milk and sour cream and various other milk and similar products in which objectionable conditions of acidity may develop, to use a batch method of adjusting such acidity to a desired amount of acid or to a desired pH or hydrogen ion concentration value by the addition of a suitable quantity of alkaline material to a carefully measured or weighed batch of the milk or cream or like material being processed. Such batch operation of acid neutralization or adjustment obviously has many disadvantages in that it entails the accumulation of a batch of material, the proper measuring or weighing thereof, the sampling and the testing of samples of such batch of material, calculating the quantity of pH adjustment or neutralizer material required, and the proper addition of the determined quantity of adjustment media to secure the desired pH value throughout the entire batch of material or the desired amount of acid in the batch of material.

It is well known that, in such materials as for example, sour milk or sour cream, an acid condition may be developed as a result of the action of certain bacteria. Such bacterial action and the resulting development of acidity, under normal temperatures, continues at a high rate until the acidity has increased to such an extent that the bacterial activity and the multiplication of bacteria decreases or terminates. Thereafter, upon the neutralization of the acid condition in such sour milk or sour cream by the addition of neutralization material to secure a pH value of approximately 7, the acid producing activity and multiplication of the bacteria again commences or increases in a reasonably short time with the resulting large increase in bacteria count in the milk or cream and the re-acidification of the milk or cream. After a lapse of an appropriate period of time further adjustment of the acid condition is again required to adjust the pH value of the milk or cream to the desired pH value close to the neutral point or a pH value of approximately 7 preferred for the satisfactory separation, churning and drying of the portions of the material. Obviously, such repeated adjustment of the acid condition in the sour milk or cream and the resulting increase or multiplication of bacteria in the milk or cream and the resulting increase in such material of the by-product of neutralization of the acid condition, introduces various serious difficulties in the production of end products having low bacterial count and desirably low percentages of the by-products of the chemical reaction which of necessity takes place upon the adjustment of the acid condition in the milk or cream.

The conventional batch methods of neutralization or pH adjustment of milk or cream, with the incidental sampling and testing and calculating, requires a highly skilled operator to avoid the addition of excessive quantities of pH correction or adjustment media. The addition of excessive quantities of such adjustment media invariably results in spoiling the flavor of the end product or products and in permanently changing certain chemical and physical characteristics of some of the elements of the milk or cream.

The batch method of processing sour dairy products, such as milk and cream, particularly when a method is utilized requiring the neutralization of the acid condition of the material, of necessity introduces variations in the bacteria count and in acid content and by-products of neutralizer reaction in the final product such as butter and dried dairy products. This is particularly true when large batches of product are being processed over an extended period of time wherein it becomes necessary to repeatedly neutralize the milk or cream before a batch of material is completely converted into the final product. Such repeated adjustment not only requires the use of considerable additional quantities of costly acid neutralizing or pH adjusting materials but also involves the use of much highly skilled labor.

There are of course alternative tests commonly used in the testing of such products as sour milk or sour cream to enable the proper adjustment of the acid condition in such cream. This invention is concerned primarily with one such test in one step of the improved process. It is therefore desired to point out that there is an important difference between pH and titratable acidity or alkalinity. pH is a measure of the intensity of the acid or alkali, whereas titratable acidity or alkalinity is a measure of the amount of acid or alkali present. In order to obtain a comprehensive view of the properties of a solution both systems could be used for the reason that different acids or alkalies have different activities when present in equal amounts.

However, in the present method for the continuous processing of a material, including the continuous adjustment of the acid or alkali content of such material, a given pH value sought in the pH adjustment step, rather than a titratable amount of acidity or alkalinity, as being the more valuable with respect to final result in the end product, is the desired objective.

The control of the pH value of a material, such as milk, is a most important step in the standardization and improvement of such products and products to be made therefrom. For example, it is most important to control the pH value of the serum in butter at a pH of 6.9 to 7.1 for butter which is to be successfully stored for any period of time, and at a pH of 6.5 to 7.0 for butter which is not to be stored. Such control gives a combination of ideal flavor and keeping quality in the finished butter. The similar type of accurate control of the pH value of the skim milk or buttermilk which is to be dried enables the efficient operation of the drying machines and the production of product having good flavor, good solubility and good keeping qualities. By the use of the present invention such control may be achieved with the use of the minimum quantity of pH adjustment media and at the same time achieve and maintain a very low bacteria count in the material and end product.

The present invention provides, as one step thereof, a continuous and automatic system for the continuous addition, to the material being processed, of the pH adjustment media and the complete reaction and conversion of the pH adjustment media with the resultant prevention of local over-neutralization frequently experienced in the conventional batch methods of adjustment, which over-neutralization results in damage to the flavor and other desired characteristics of the end product. The elimination of the batch method also eliminates the inconveniences and expenses of elaborate testing, computing acid numbers or percentages, etc. The use of the present invention includes the step of continuously and automatically adding the correct amount of pH adjustment media to the material being processed to secure the desired hydrogen ion concentration in the end product with a minimum of effort and a maximum of accuracy.

In the manufacture of butter, the conventional methods of batch and/or continuous operation do not include satisfactory provisions for the use of the normal by-products of butter manufacture, as for example, the skim milk and the buttermilk by-products. The batch methods of manufacturing butter commonly utilize the drum-type churn and worker wherein the capacity of the churn and worker are limited by the necessity of handling large quantities of buttermilk, which buttermilk in such batch methods must be removed from the churn and stored if it is to be subsequently utilized. Similarly the separation of milk or thin cream to produce cream of desired milk fat concentration entails the storage of the skim milk if it is to be utilized in the subsequent manufacture of a product. Such storage of large quantities of skim milk or buttermilk necessitates the use of expensive equipment and, in the event the product is to be dried, requires the continued adjustment and control of the pH value of the material.

A unique advantage of the present invention is the provision of a coordinated system and method wherein the pH value of the material such as sour milk or sour cream is adjusted only once immediately before the final conversion of the material into the end products. The pH adjusted skim milk, secured from an incidental separation of the sour milk or the incidental concentration of the cream to a desired milk fat content, is immediately dried before the pH value thereof has an opportunity to vary appreciably from the adjusted value or the acid bacteria again becomes active. The milk fat in the pH adjusted cream is promptly agglomerated or converted into butter flakes by mechanical agitation, separated from the buttermilk and transferred to one of a series of drum-type workers for working to produce the desired body and texture in the butter. The drum-type worker, in the absence of the buttermilk, can be used to work at least twice the normal rated capacity of butter determined for such worker for a normal batch churning and working operation. The buttermilk, while yet properly adjusted as to its pH is promptly re-separated to salvage any milk fat remaining therein. The separated fraction containing the milk fat is returned to the cream supply ahead of the churn for re-introduction into the churn and further churning. The separated buttermilk fraction is promptly dried without the necessity of further adjustment of the pH value thereof.

One of the primary objectives of this invention is therefore to provide a new, novel and useful and continuous and automatic system including interacting apparatus and a new method whereby a continuously flowing stream of a creamery or dairy product may be converted into butter, dried skim milk and dried buttermilk, each having a uniformly and accurately adjusted and predetermined pH value, secured and maintained at a predetermined pH value by the use of a minimum of pH adjustment media, wherein the bacterial growth in the material being processed and the bacteria count in the finished product is reduced to a minimum, and wherein there is provided a new, novel and useful, continuous and automatic system and method for manufacturing butter with a minimum loss of milk fat and for drying the by-products of such manufacture, for example, the skim milk and the buttermilk, with all the end products having the recognized characteristics of high quality.

Another primary objective of this invention is to provide a continuous method and automatic apparatus for the control and adjustment of the hydrogen ion concentration or pH of the material being processed, especially food products such as milk, skim milk, cream, buttermilk, whey, etc. whereby to prevent the necessity for the repeated addition of pH adjustment media and to avoid the coagulation of solids during the processing operations and to improve the separating qualities of the product being processed.

A still further object of this invention is to provide a continuous and automatic system and method of treating a flowing stream of material being processed wherein the pH value thereof is continuously and automatically adjusted and maintained without impairing the flavor of the product as may frequently result from chemical reactions brought on by local over-neutralization incidental to the excessive or improper addition of pH adjustment media frequently experienced in batch methods of adjustment.

An additional objective of this invention is to provide a rapid and continuous and automatic system for quickly carrying out an improved method of processing material, such as the processing of a biological material containing bacteria and having a varying pH, wherein the bacteria growth is held to a minimum and wherein the pH of the material resulting from bacterial action is neutralized by the use of one pH adjustment reaction involving the use of a minimum quantity of pH adjustment media.

Another object of this invention is to provide a system and method wherein a single pH adjustment operation is sufficient to permit the efficient and satisfactory centrifugal separation of the milk being processed, the making of the butter, the centrifugal separation of the buttermilk and the drying of the skim milk and the buttermilk, all while the pH value is accurately controlled and the bacteria count is held to a minimum.

The foregoing and other objectives, important novel and useful features and advantages of this invention will become more apparent and more easily understood upon examination of the following description thereof and the accompanying drawings and appended claims. It should, however, be remembered that, without desire of limitation, the invention will be described and illustrated as the preferred embodiment and method of using the invention in apparatus and method for the continuous manufacture of butter and dried milk and dried buttermilk. Certain changes and variations may suggest themselves to those skilled in the pertinent arts upon review of this application, which changes may not, however, depart from the spirit of this invention and may come within the scope of the appended claims.

In the accompanying drawings:

FIGURE 1 is a diagrammatic representation of a system of apparatus suitable for and well adapted for the performance of the preferred variant of this invention. The diagram is in the form of a flow chart depicting the flow of milk and/or cream in the preferred variant of this invention in a continuous process wherein the lacteal fluid is converted into butter, dried skim milk and dried buttermilk;

FIGURE 2 is an enlarged diagrammatic illustration of the preferred type of continuously operable hydrogen ion concentration or pH adjustment device comprising one of the units of the system illustrated in FIGURE 1 of the drawings; and FIGURE 3 is a partial diagrammatic view and a partial vertical sectional view of apparatus usable as a churn for converting the milk fat content of the cream being processed into butter flakes or granules.

Referring to the drawings, in which like elements are identified by like numerals, and referring in particular to FIGURE 1 of the drawings, and having in mind the preferred embodiment of the invention in apparatus and method improvements for the continuous manufacture of butter and dried milk and dried buttermilk, sour milk or sour cream is continuously supplied from the supply tank 10, having an attempering coil 11 and agitator 12, through pipe 13 and pump 14, to filter 15. From filter 15 the filtered milk or cream is circulated through pipe 16 and pump 17, which pump comprises part of the pH adjustment unit 18, hereinafter to be more fully described, and through pipe 19 to a heating unit 20. While the milk or cream is flowing through the pH adjustment device 18, the milk or cream is automatically and continuously sampled and tested as to its pH value or hydrogen ion concentration, and adjusted to a desired pH value of 6.9 to 7.1 for butter to be stored and 6.5 to 7.0 for butter intended for prompt consumption, by the uniform addition of the necessary quantity of a suitable pH adjustment media, such as liquid alkaline and acid pH adjustment media. The heater 20 may, if desired, be of any of the conventional pressure type heaters, such as for example, tubular heaters or plate type heaters, and should have sufficient capacity to properly and quickly attemper the stream of material, such as milk or cream, to a satisfactory separating temperature. The heater 20, may if desired, also comprise a pasteurizer of any of the well known types, and may be used to pasteurize the product being processed.

From the heat exchanger 20, the attempered product which has been satisfactorily adjusted as to pH value to assure the desired pH value in the end product and to assure satisfactory separating characteristics, flows through conduit 21 into a centrifugal separator 22.

Separator 22 separates the attempered and neutralized milk or cream into a fraction containing a relatively high milk fat content, preferably of the nature of 30% to 40%, satisfactory for churning butter. The separation fraction containing the high milk fat content is discharged from separator 22 through conduit 23. The separation fraction containing primarily the skim milk, flows from separator 22 through conduit 24 to a skim milk drying arrangement, hereinafter to be more fully described.

From pipe 23 the high fat content cream flows into a surge tank 25 from which it is pumped by means of conduit 26 and pump 27 into and through an attempering device 28. The attempering device 28 may, if desired, consist of a plate type heat exchanger so constructed and arranged as to be adapted to quickly and continuously pasteurize and then cool the milk or cream supplied thereto to a satisfactory churning temperature. From the unit 28 the milk or cream flows continuously through pipe 29 into a surge tank 30 provided with an attempering coil 31 and agitator 32.

It should be remembered that in the event that the attempering unit 20 has been used to pasteurize the material being processed, then the unit 28 may need to be used only as a cooler if necessary, or may be eliminated entirely if the unit 30 has sufficient attempering capacity to attemper the cream to a satisfactory churning temperature. Similarly the milk or cream may be satisfactorily attempered for centrifugal separation in supply tank 10 in which instance the attempering unit 20 may be eliminated, and the necessary heating and/or cooling and/or pasteurizing done in the unit 28 or the units 28 and 30. At the unit 30 there is provided a dispensing unit 80 adapted to be used when desired to supply to the cream in vat 30 various additives as for example, flavor and/or starter ingredients in predetermined quantities to be incorporated in the butter.

The cream, ready for churning, and of a desired pH value and temperature, is conducted through pipe 33 from tank 30 to a mechanical agitator and atmospheric pressure type butter churn 34, hereinafter to be more fully described. In the churn 34 the cream is subjected to mechanical stresses such as violent agitation, whereby to break the normal emulsion of the cream and to convert the cream into butter flakes or granules formed from the milk fat in the cream and into buttermilk.

The butter granules and buttermilk of predetermined pH are discharged continuously from churn 34 through shroud 78 into hopper 35 of a rotary auger type of butter flake and buttermilk separator 36. Separator 36 may be of the jacketed type to enable suitable attempering by the circulation of attempering media through jacket 37 surrounding the auger enclosing cylinder 38. The rotary auger 39 of separator 36 is preferably inclined upwardly from left to right as viewed in the drawings and is provided with radial slots 40 so arranged as to permit the butter flakes to be moved from left to right upon the appropriate rotation of auger 39 by drive motor 41. The radial slots 40 are also so constructed and arranged as to permit the buttermilk to drain away from the butter flakes by flowing from right to left through the slots 40 and accumulate at the lower left hand end of the chamber 38 from whence the buttermilk is pumped by pump 42 through pipe 43 to the centrifugal buttermilk separator 44. Separator 44 separates the buttermilk into two fractions. One separation fraction containing primarily skimmed buttermilk flows from separator 44 through conduit 45 to a buttermilk drying arrangement, hereinafter to be more fully described. The separation fraction containing the recovered milk fat flows from separator 44 through pipe 46 to surge tank 25 to be blended with the cream and to be returned to the churn 34.

Butter flakes are discharged from separator 36 into an adjustable chute 81 and are thereby conducted to a selected one of a plurality of butter workers 47. Workers 47 may be of the conventional drum type. The three workers 47 are used in rotation to work butter granules into a homogeneous mass of butter having the desired pH and having the desired body and texture. By the use of the three workers 47 in rotation, it is possible to use one worker to receive butter granules from chute 81 while another worker 47 is being operated to work butter and while the third worker 47 is being emptied, thereby making the operation continuous.

The workers 47, which are preferably of the conventional drum type are so constructed and arranged that during the working of the butter such ingredients as salt etc. may be added if desired.

From the workers 47 the finished butter may be discharged on to conveyors 82 and conveyed to a suitable packaging and discharge device 48.

Referring again to the skim milk discharged through pipe 24 from separator 22, the pH concentration of which skim milk was suitably adjusted immediately prior to the separation operation, such skim milk is in satisfactory condition for immediate drying without requiring further pH adjustment. The skim milk therefore flows from pipe 24 through a continuous acting pre- heating unit 49 and through pipe 50 to a drying unit 51. Drying unit 51 may be of any of the conventional type milk driers, such as for example roll type driers, spray driers, etc. From the drier unit 51 the dried milk product may be passed to and through passage 52 to a suitable packaging unit 53.

Referring again to the skimmed buttermilk discharged from centrifugal separator 44 through pipe 45, such skimmed buttermilk, having shortly theretofore been adjusted as to pH value while flowing through unit 18, is in satisfactory condition for immediate drying and flows from pipe 45 through the continuously acting pre-heater 54 and pipe 55 to a drying unit 56. Drying unit 56 may be of the same type specified for drying unit 51. The dried buttermilk product is discharged from drying unit 56 through conduit 57 to a suitable packaging unit 58.

The pH or hydrogen ion concentration testing and adjusting unit indicated generally by the numeral 18 is illustrated in more detail in FIGURE 2 of the drawings. A suitable sample of the material being processed i.e. sour milk or sour cream in the described variant of this invention, is continuously withdrawn from the discharge pipe 19 of pump 17 and conducted through pipe 59 to and through the electrode chamber or pH sensing chamber 60. From chamber 60 the test sample is in turn discharged again through pipe 61 to the inlet or suction side 16 of pump 17. Pipe 61 may if desired be equipped with a suitable throttle valve 62 near the electrode chamber 60. The contact of the electrodes in chamber 60 with the test sample of the material being processed produces a difference in potential between the electrodes.

The electrodes in chamber 60 are operatively connected to the amplifier unit 63 which is in turn operatively connected to control unit 64. The difference in potential or signal developed in chamber 60 is amplified in unit 63. The amplified signals developed in chamber 60, as amplified in unit 63, are in turn utilized by control unit 64 to control the flow of air under pressure through unit 64 into either one of the two pipes 65 or 66 to either one of the two bellows actuated valves 67 or 68 respectively. Air under pressure is supplied to controller 64 through pipe 69 from air compressor 70. Valves 67 and 68 are operatively connected in branches 71 and 72 respectively of a pH adjustment material supply pipe 73 which is so connected as to discharge into pipe 61 between the throttle valve 62 and pump 17. The lower free ends of pipes 71 and 72 extend respectively into supply receptacles 74 and 75 for the storage of liquid alkaline and acid pH adjustment media respectively.

In the operation of the pH control and adjustment unit 18, the pH sensing signal or potential difference developed in the electrode chamber 60 is in turn acted upon by the amplifier 63. Controller 64 in turn responds to the amplified signals received from unit 63 whereby to controllably actuate either one of the valves 67 or 68. Upon the opening of either valve 67 or 68 the selected pH adjustment media is drawn from either receptacle 74 or 75, as the case may be, by the suction of the pump 17 and flows through pipes 73 and 61 into the stream of material being processed as such material is about to enter pump 17.

Referring to FIGURE 3 of the drawings, it should first be noted that many types of mechanical agitators may be used to churn cream and convert the milk fat content thereof into butter flakes or granules. The illustrated arrangement of churn 34 contemplates an upwardly tilted cylinder 84 having an internal diameter of approximately six inches and a length of approximately sixteen inches. A jacket 85 for the circulation of attempering media surrounds the cylinder 84. A four bladed agitator 76 with the blades extending longitudinally of cylinder 84 and close to but out of contact with cylinder 38 is coaxially mounted within the cylinder 84 and may be driven by motor 77 at a speed of approximately 2800 r.p.m. to efficiently and effectively churn the cream supplied through pipe 33 to the lower end of cylinder 84 and quickly convert at least the major portion of the milk fat content thereof into butter flakes or granules. From the churn 34 the butter flakes and buttermilk are discharged from the upper right hand end of cylinder 84 through shroud 78 to the hopper 35 of the buttermilk separator 36. Shroud 78 is open to the atmosphere at 79 to provide an ample supply of atmospheric air to the interior of churn 34.

Although in the flow system of FIGURE 1 there have been included a series of pumps such as pumps 14, 27 and 42, it should be remembered that variations in relative arrangement of the units of the system as previously suggested may be made thereby rendering one or more of the illustrated pumps unnecessary. Similarly, a filter 16 may not be required; the material being processed may have been filtered before introduction into tank 10. The possible interchange of some of the functions of attempering units 20, 28 and 30 has hereinbefore been explained.

One of the aspects of the present invention is that the product being processed, as for example, sour cream, wherein an acid condition may develop due to bacterial action, is continuously tested with respect to hydrogen ion concentration and continuously and uniformly adjusted to a predetermined hydrogen ion concentration desired in the end product by one adjustment, and is then promptly converted into an end product having the predetermined hydrogen ion concentration before the bacteria can again multiply and before the bacterial action can cause a variation in the hydrogen ion concentration, whereby to produce an end product or end products having a minimum bacteria count and a minium of by-products of the chemical reaction incident to the pH adjustment reaction, and having the predetermined hydrogen ion concentration.

From the foregoing description of this invention and from the accompanying drawings, it will be apparent that this invention realizes the introductorily enumerated objectives respecting the improved apparatus and method for churning and drying a product such as for example, a dairy product. It will similarly be apparent that the invention also possesses the hereinbefore listed advantages and provides a new, novel and useful system and method for churning and drying a product such as for example, a dairy product.

Having thus described and illustrated the preferred embodiment of this invention in an improved system and method for churning and drying, the invention is not to be interpreted as being restricted to the specifically illustrated and described embodiment as set forth in the drawings and as hereinbefore described, except insofar as is necessitated by the appended claims and the disclosures of the prior art.

The invention is hereby claimed as follows:

1. A system for continuously processing sour lacteal liquid to produce butter and dried buttermilk having a predetermined pH and a low bacteria count, comprising, in combination, a source of supply of a stream of sour lacteal liquid, filter means, pH sensing and adjusting means for continuously sensing and adjusting the pH of the lacteal liquid to a predetermined pH, attempering means for continuously attempering the pH adjusted liquid to a satisfactory temperature for centrifugal separation, first centrifugal separator means for continuously separating the lacteal liquid into a first fraction of separation consisting primarily of skim milk and into a second fraction of separation having a relatively high milk fat content and having a normal milk fat in serum phase relationship, pasteurizing and cooling means for continuously pasteurizing and cooling the second fraction of separation, continuously operable churn means for continuously disrupting the normal milk fat in serum phase relationship of the second fraction of separation and continuously converting milk fat into butter granules and continuously converting the remainder of the second fraction of separation into buttermilk, continuously operable butter granule separator means for continuously separating the churned material into a third fraction of separation consisting of buttermilk and into a fourth fraction of separation consisting of butter granules, second centrifugal separator means for continuously separating the buttermilk into a fifth fraction of separation containing a relatively high concentration of milk fat and into a sixth fraction of separation consisting primarily of buttermilk, conduit means for returning the fifth fraction of separation to the stream of lacteal liquid ahead of said churn means, preheater and drier means for receiving the sixth fraction of separation from said second centrifugal separator means and continuously converting the solids content thereof into dried buttermilk, and material transfer means connecting the foregoing devices in series in the order mentioned for moving the material being processed through the devices in the order and for the purposes mentioned.

2. A system for producing butter, comprising, in combination, a source of supply of milk product containing butter fat in the dispersed phase and having a pH varying from the pH desired in the butter, pH sensing and adjusting means, destabilizing and churning means for destabilizing the milk product and agglomerating milk fat into butter flakes and producing buttermilk, separator means for separating butter flakes from the buttermilk, worker and texture developing means for working and texturating the separated butter flakes into a homogeneous mass of butter having desired body and texture characteristics, and transfer means for sequentially and promptly and continuously transferring milk product being processed through the different stages of processing in the different processing means in the order mentioned.

3. A system for producing butter, comprising, in combination, a source of supply of milk product containing milk fat in the dispersed phase, pH sensing and adjusting means, agglomerating means for promptly and continuously agglomerating milk fat in the milk product to produce butter granules before the pH of the milk product varies appreciably from the pH to which the milk product was adjusted, separator means for separating the buttermilk from the butter granules, worker and texture developing means for working the separated butter granules into a homogeneous mass having a predetermined pH and imparting a desired body and texture thereto, and transfer means for transferring milk product being processed through the different stages of processing in the different processing means in the order mentioned.

4. A system according to claim 3, wherein a centrifugal separator is operatively connected in the transfer means intermediate the pH sensing and adjusting means and the agglomerating means, for concentrating the milk fat content of the pH adjusted milk product being processed.

5. Apparatus for processing a material and converting at least a portion of said material into a worked and textured product, comprising, in combination, a source of supply of material to be processed, pH sensing and adjusting means, separating means, agglomerating or aggregating means, worker means, and transfer means for continuously moving at least portions of the material being processed through the different stages of processing in the different processing means in the order mentioned before the pH of the material as adjusted can vary appreciably from the adjusted pH.

6. A system for producing butter from milk product having a pH of less than 7, comprising, in combination, a source of supply of milk product wherein the milk fat is in the dispersed phase and wherein the pH of the serum is appreciably less than a pH of 7, continuous sampling and pH sensing and adjusting means for continuously sampling a stream of the milk product and automatically and continuously sensing the pH value of the serum content thereof and continuously and automatically adding pH adjusting media to the stream of the milk product ahead of said continuous sampling means and in controlled quantities responsive to said sensing means, butter flake and buttermilk forming means for promptly and continuously forming butter flakes from the milk fat contained in said stream of milk product and converting the remainder of said stream of milk product into buttermilk after the pH adjusting media has been added to said stream, separate worker and texture developing means for working and texturating the butter flakes into a homogeneous butter mass having predetermined pH and having desired body and texture characteristics, conduit means connecting the foregoing devices in series in the order mentioned, and circulating means for circulating the material being processed through the series connected devices.

7. A system according to claim 6, having means for returning the sample portion of the milk product to the stream of the milk product ahead of said continuous sampling means.

8. A system according to claim 6, having separator means for separating buttermilk from the butter flakes.

9. A system according to claim 6, having separator means for separating skim milk from the pH adjusted milk product before the milk product is introduced into said butter flake forming means.

10. Apparatus for continuously producting a product having a predetermined and accurately controlled pH and a low bacteria count from ingredients of variable pH and containing bacteria which react with the ingredients to produce variations in the pH, comprising, in combination, a source of supply of the ingredients to be converted into a product, pH sensing and adjusting means, converting means for promptly and continuously converting selected fractions of the ingredients in which the pH has been adjusted to a predetermined desired magnitude into a product having a predetermined pH and a minimum bacteria count, and transfer means for continuously flowing a stream of the ingredients being processed through the mentioned devices in the order mentioned.

11. In combination, cream supply means for continuously supplying cream containing milk fat in the dispersed phase and serum to butter churn means, butter churn means for continuously churning the cream containing milk fat in the dispersed phase and converting the fat content thereof into butter and converting the serum content thereof into buttermilk, first separator means for continuously separating the thus formed butter from the thus formed buttermilk, second separator means for separating the buttermilk into a first fraction of separation containing recovered milk fat and into a second fraction of separation containing skimmed buttermilk, and return means for returning said first fraction of separation containing the recovered milk fat to said cream supply means.

12. A system for continuously processing lacteal liquid to produce butter having a predetermined pH and a low bacteria count, comprising, in combination, a source of supply of a stream of lacteal liquid, filter means, pH sensing and adjusting means for continuously sensing and adjusting the pH of the lacteal liquid to a predetermined pH, attempering means for continuously attempering the pH adjusted liquid to a satisfactory temperature for centrifugal separation, first centrifgual separator means for continuously separating the lacteal liquid into a first fraction of separation consisting primarily of skim milk and into a second fraction of separation having a relatively high milk fat content and having a normal milk fat in serum phase relationship, pasteurizing and cooling means for continuously pasteurizing and cooling the second fraction of separation, continuously operable churn means for continuously disrupting the normal milk fat in serum phase relationship of the second fraction of separation and continuously converting milk fat content thereof into butter granules and continuously converting the remainder of the second fraction of separation into buttermilk, continuously operable butter granule separator means for continuously separating the churned material into a third fraction of separation consisting of buttermilk and into a fourth fraction of separation consisting of butter granules, and worker means for receiving butter granules from said butter granule separator means for working the butter granules into a homogeneous mass of butter.

13. A system for producing dried buttermilk from milk product having a pH of less than 7, comprising, in combination, a source of supply of milk product wherein the milk fat is in the dispersed phase and wherein the pH of the serum is appreciably less than a pH of 7, continuous sampling and pH sensing and adjusting means for continuously sampling a stream of the milk product and automatically and continuously sensing the pH value of the serum content thereof and continuously and automatically adding pH adjusting media to the stream of the milk product ahead of said continuous sampling means and in controlled quantities responsive to said sensing means, butter flake and buttermilk forming means for promptly and continuously forming butter flakes from the milk fat contained in said stream of milk product and converting the remainder of said stream of milk product into buttermilk after the pH adjusting media has been added to said stream, separator means for separating buttermilk from the butter flakes, buttermilk drying means for promptly drying the separated buttermilk before the pH thereof varies appreciably from the pH to which the milk product was adjusted, conduit means connecting the foregoing devices in series in the order mentioned, and circulating means for circulating the material being processed through the series connected devices.

References Cited in the file of this patent

UNITED STATES PATENTS

| | | |
|---|---|---|
| 2,406,819 | Farrall | Sept. 3, 1946 |
| 2,423,834 | Horneman et al. | July 15, 1947 |
| 2,463,363 | Dunkley | Mar. 1, 1949 |
| 2,638,419 | Robichaux | May 12, 1953 |